United States Patent [19]

Kask

[11] 4,191,050
[45] Mar. 4, 1980

[54] LIQUID LEVEL INDICATING FLOATS

[75] Inventor: Eugene Kask, Willimantic, Conn.

[73] Assignee: Rogers Corporation, Rogers, Conn.

[21] Appl. No.: 952,497

[22] Filed: Oct. 18, 1978

[51] Int. Cl.² .............................................. G01F 23/06
[52] U.S. Cl. .................................. 73/322.5; 116/228; 116/229
[58] Field of Search ...................... 73/322.5, 317, 713, 73/318; 116/228, 229; 261/68, 70, DIG. 53, DIG. 52; 137/426; 4/394, 395; 85/5 CP, 8.8, 8.3

[56] References Cited

U.S. PATENT DOCUMENTS

| | | | |
|---|---|---|---|
| 715,386 | 12/1902 | Jones | 73/322.5 |
| 2,385,565 | 9/1945 | Cox | 85/8.8 |
| 2,526,294 | 10/1950 | Stegeman | 4/325 |
| 2,633,144 | 3/1953 | Smith | 73/322.5 |

Primary Examiner—S. Clement Swisher
Assistant Examiner—Denis E. Corr
Attorney, Agent, or Firm—Fishman and Van Kirk

[57] ABSTRACT

Liquid level indicating floats which may be used, for example, to measure the level of gasoline in a fuel tank or to monitor the flow of fuel through a carburetor. In one embodiment, the float comprises a generally cylindrical body portion which terminates in an outwardly protruding cylindrical ledge having an upper surface and a lower surface, the ledge having a predetermined thickness. A supporting arm is provided which includes a loop which engages the lower surface and an elongated end portion extending from the loop which engages the upper surface of the ledge to secure the supporting arm of the float. In another embodiment of the invention, the float comprises a cylindrical body portion having two chordal grooves cut therein to allow for insertion of a loop having linear portions, the linear portions adapted to engage the chordal grooves.

3 Claims, 10 Drawing Figures

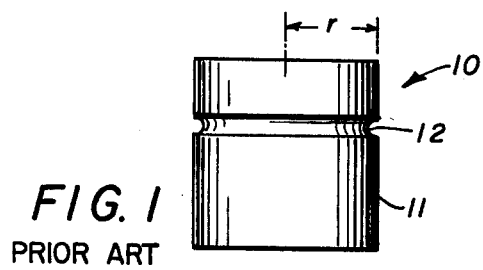
FIG. 1
PRIOR ART
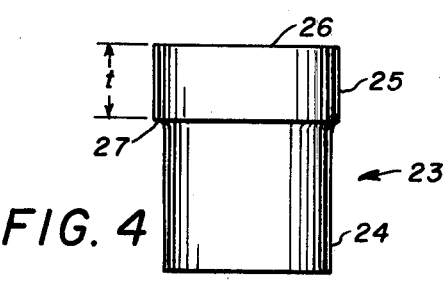
FIG. 4
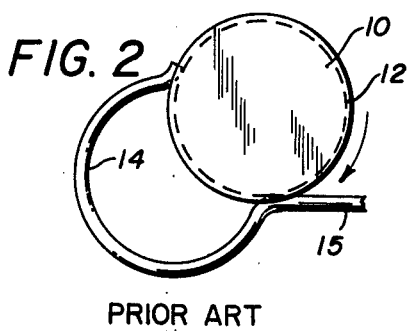
FIG. 2
PRIOR ART
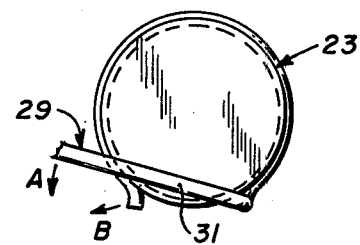
FIG. 5
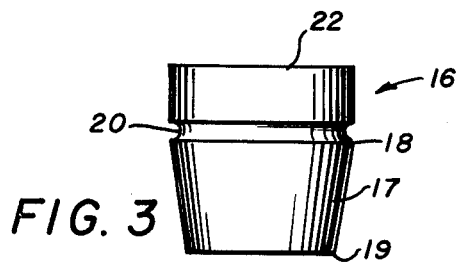
FIG. 3
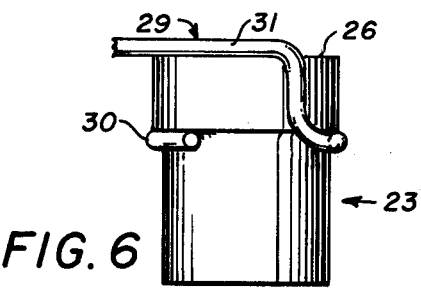
FIG. 6
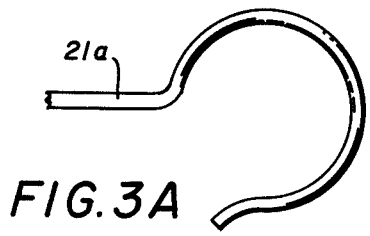
FIG. 3A
FIG. 3B
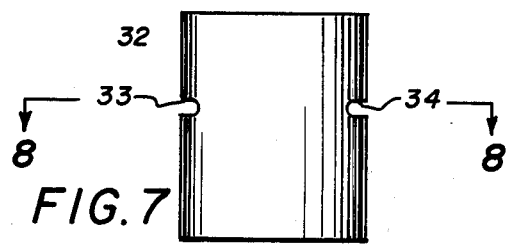
FIG. 7
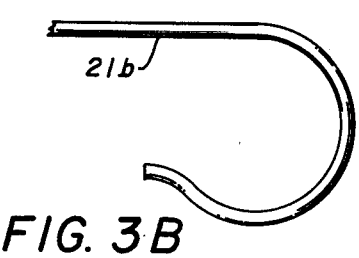
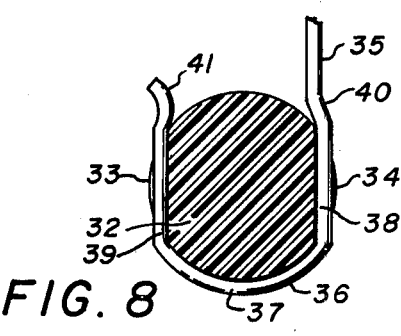
FIG. 8

LIQUID LEVEL INDICATING FLOATS

BACKGROUND OF THE INVENTION (1) Field of the Invention

The present invention relates to liquid level indicating floats. More particularly, the present invention relates to liquid level indicating floats which may be used to measure the level of gasoline in a fuel tank or to monitor the flow of fuel through a carburetor.

(2) Description of the Prior Art

FIGS. 1 and 2 show a conventional float. The float, indicated generally at 10, includes a cylindrical body portion 11 having a radius, r. Cylindrical body portion 11 includes a radiused groove 12 adapted for the engagement of loop 14 on supporting arm 15. Extending from loop 14 is elongated sensing arm 15 which may be connected to a conventional means for measuring the movement of float 10.

Conventional floats may be manufactured from a brittle cellular material such as hard rubber or any other material having closed cells. The material used in some applications has a relatively low mechanical and abrasive strength. Some conventional floats are made from thin sheet metal shells. The method of attaching supporting arm 15 to float 10 comprises aligning loop 14 with groove 12 of the float and rotating the float in the direction of the arrow in FIG. 2. As loop 14 is forced open by the float, highly localized stresses are generated between the loop and the float, particularly in areas where the open end of the loop is in contact with the float material. This localized stress can cause damage to the float such as chipping or abrading the sharp cylindrical edges of the float. In the case where the float is made from thin sheet metal shells, the shells may be deformed or punctured. A punctured float, of course, would not be capable of functioning in the desired manner.

It is the principal object of the present invention to provide a float and support arm combination which allows for attachment of the arm to the float without substantial damage to the float.

SUMMARY OF THE INVENTION

The present invention provides a float and supporting arm which may be attached with little danger of damage to the float. In one embodiment of the invention, the liquid level measuring float is adapted to be supported by a supporting arm having an engagement loop on one end thereof. The float compises a frustoconical body portion including one end thereof having a larger radius than the other end, the larger radiused end terminating in a retaining groove shaped to engage the loop of the supporting arm.

In another embodiment of the invention, a generally cylindrical body portion terminates in an outwardly protruding cylindrical ledge having a predetermined thickness and an upper and lower surface. A supporting arm having a loop at one end thereof engages the lower surface and has a smaller diameter than the ledge. The supporting arm includes an elongated end portion extending from the loop which engages the upper surface of the ledge to secure the supporting arm to the float.

In a third embodiment of the invention, the float comprises a cylindrical body portion having two chordal grooves cut therein to allow for the attachment of a supporting arm thereto. The supporting arm includes a loop having two linear portions which are adapted to engage the two chordal grooves. The arm is affixed to the float by sliding the linear portions of the loop with respect to the chordal grooves until the float is firmly engaged by the loop.

BRIEF DESCRIPTION OF THE DRAWINGS

FIG. 1 is a side view of a prior art float;

FIG. 2 is a top view of the prior art float of FIG. 1 and shows a method by which a supporting arm is affixed to the float;

FIG. 3 is a side view of the first embodiment of a float, FIGS. 3A and 3B showing top views of supporting arms which may engage the float in FIG. 3;

FIG. 4 is a side view of the second embodiment of the float;

FIG. 5 is a top view of the second embodiment of the float having the supporting arm attached thereto;

FIG. 6 is a side view of the second embodiment of the float having the supporting arm attached thereto;

FIG. 7 is a side view of a third embodiment of the float; and

FIG. 8 is a top view along the lines 8—8 of FIG. 7 and wherein a supporting arm is affixed to the float.

DETAILED DESCRIPTION OF THE INVENTION

FIG. 3 shows one embodiment of the present invention. A liquid level measuring float is shown generally at 16. Float 16 comprises frustoconical body portion 17 including one end 18 having a larger radius than the other end 19. The larger radiused end 18 terminates in a retaining groove 20 which is preferably radiused to secure either supporting arm 21A or supporting arm 21B as shown in FIGS. 3A and 3B. Float 16 also includes a cylindrical body portion 22 which extends from groove 20 on the side of the groove opposite to frustoconical body portion 17.

In the manufacture of the float and support arm assembly, support arm 21A or 21B is pushed upwardly along the surface of frustoconical body portion 17 and is spread apart either by mechanical means or by the force of the wall of frustoconical body portion 17 against the inner surface of supporting arm 21A or 21B. It should be understood that the advantage achieved with the above-described structure is that supporting arm 21A or 21B does not abrade the surface of frustoconical body portion 17 except at a small portion near groove 20. Thus, damage to float 16 is reduced or eliminated. It should also be understood that the selection of the material for the supporting arm is important in minimizing the damage to the float. In a case where a strong and stiff supporting arm is needed, such an arm having a great length, a fixture must be used to open the loop slightly at the time of assembly.

FIGS. 4, 5, and 6 show a second embodiment of the present invention. Referring to FIG. 4, liquid level measuring float 23 comprises a generally cylindrical body portion 24 which terminates in an outwardly protruding cylindrical ledge 25 having an upper surface 26 and a lower surface 27 and having a predetermined thickness, t. Although it is preferable that portions 24 and 25 by cylindrical, it should be understood that these portions can have other shapes such as being frustoconically shaped. Lower surface 27 of ledge 25 is radiused to provide for engagement of loop 30 of supporting arm 29.

FIGS. 5 and 6 show the structure of supporting arm 29 and show the manner in which supporting arm 29 is affixed to float 23. Supporting arm 29 includes a loop 30 which is shaped to interfit with lower surface 27 of ledge 25 and is radiused to coincide with the radius of surface 27. Supporting arm 29 includes a second elongated end portion 31 extending therefrom which is spaced the predetermined distance, t, from loop 30 and which is bent inwardly with respect to the axis of float 23 to engage surface 26 so as to secure supporting arm 29 to ledge 25.

During installation of supporting arm 29, end portion 31 is bent outwardly from the axis of float 23, as shown by arrow A, and the end of loop 30 is either held in place or bent a slight amount outwardly from the axis of float 23 as indicated by arrow B. Arm 29 is then slid upwardly along generally cylindrical body portion 24 and when loop engages lower surface 27, end portion 31 of loop 29 is allowed to spring back inwardly toward the axis of float 23 in the position as shown in FIGS. 5 and 6. Supporting arm 29 is preferably made of spring steel. It should be understood that, as supporting arm 29 is attached to float 23, there is very little abrasion by arm 29 on float 23.

FIGS. 7 and 8 show another embodiment of the present invention. FIG. 7 shows a side view of a float which comprises a cylindrical body portion 32 including two chordal grooves 33 and 34 which preferably extend in parallel relation to each other. Although it is preferred that body portion 32 have a cylindrical shape, it should be understood that other shapes may be used as long as the shapes include two parallel grooves for engagement of a supporting arm.

As best shown in FIG. 8, the supporting arm comprises an elongated portion 35 and a loop portion 36. The loop portion 36 includes a circular shaped portion 37 adapted to be positioned against one of the walls of the cylindrical float. Loop 36 also includes two parallel linear sections 38 and 39 which are engaged respectively within grooves 33 and 32. The end of linear portions 38 and 39 include inwardly curved portions 40 and 41 which retain the float 32 in contact with the supporting arm. As shown in FIG. 8, float 32 would be moved downwardly with respect to the supporting arm so as to spread portions 40 and 41 to allow for grooves 33 and 34 to engage linear portions 38 and 39 of the supporting arm. Alternatively, a fixture may be used to spread curved portions 40 and 41.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A liquid level indicating float comprising a generally cylindrical body portion terminating in an outwardly protruding cylindrical ledge having an upper surface and a lower surface, said ledge having a predetermined thickness, and a supporting arm having a loop which engages said lower surface and having an elongated end which engages said upper surface.

2. A liquid level indicating float comprising a body portion defining an outer wall, said outer wall including at least two substantially parallel grooves and a supporting arm including a loop having two parallel linear portions which are adapted to be engaged within said grooves.

3. A liquid level indicating float according to claim 2 wherein said body portion has a cylindrical shape and said grooves are chordal with respect to the cylindrical body portion.